(12) United States Patent
Kuplicki

(10) Patent No.: US 6,515,616 B1
(45) Date of Patent: Feb. 4, 2003

(54) SYSTEM AND METHOD FOR ALIGNING SIGNALS HAVING DIFFERENT PHASES

(75) Inventor: Michael G. Kuplicki, Snohomish, WA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

(21) Appl. No.: 09/303,075

(22) Filed: Apr. 30, 1999

(51) Int. Cl.$^7$ .............................. G01S 7/40; G01S 13/00
(52) U.S. Cl. ........................ 342/174; 342/74; 342/81; 342/165; 342/173; 342/368; 342/371; 342/372
(58) Field of Search ................................ 342/165, 169, 342/170–175, 195, 368, 371, 372, 369, 370, 373–377, 73–103

(56) References Cited

U.S. PATENT DOCUMENTS 4,791,421 A * 12/1988 Morse et al. ............... 342/368
5,263,189 A    11/1993 Kultgen et al.

FOREIGN PATENT DOCUMENTS

EP    0417689 A    9/1990
GB    2171849 A    2/1985

OTHER PUBLICATIONS

PCT Search Report (PCT/US00/06891) dated Jul. 13, 2000.
PCT Written Opinion (PCT/US00/06891, dated Dec. 19, 2000.

* cited by examiner

Primary Examiner—Bernarr E. Gregory
(74) Attorney, Agent, or Firm—Fulbright & Jaworski L.L.P.

(57) ABSTRACT

A system and method for changing the phase relationship of input signals so as to generate a composite signal having the strongest possible signal. One related input vector signal is phase rotated and a phase is selected which yields the smallest value of the output composite signal. The selected phase is rotated 180 degrees. This procedure for that input signal is repeated for each input vector signal. When all inputs have thus been adjusted, the procedure can be repeated until the output composite signal is essentially free of errors.

16 Claims, 2 Drawing Sheets

SYSTEM AND METHOD FOR ALIGNING SIGNALS HAVING DIFFERENT PHASES

RELATED APPLICATION

The present application is related, and reference hereby made, to commonly assigned patent application entitled "SYSTEM AND METHOD FOR FULLY SELF-CONTAINED CALIBRATION OF AN ANTENNA ARRAY," Ser. No. 09/092,429 filed Jun. 5, 1998, now U.S. Pat. No. 6,133,868, the disclosure of which application is incorporated herein by reference.

TECHNICAL FIELD

This invention relates to signal alignment techniques and more particularly to systems and methods for aligning signals having different phases so that a given goal can be achieved by the aligned signals.

BACKGROUND

Currently multiple vectors are phase aligned by measuring the phase of each vector separately and adjusting each vector to a reference phase. To perform this alignment, the phase of each vector must be measured relative to a reference phase. Phase is a difficult measurement to make, and since each vector is measured separately, any errors in the phase measurements of the separate vectors add when the vectors are combined.

One system for using such an alignment technique is the above-identified patent application entitled SYSTEM AND METHOD FOR FULLY SELF-CONTAINED CALIBRATION OF AN ANTENNA ARRAY, Ser. No. 09/092,429 filed Jun. 5, 1998, now U.S. Pat. No. 6,133,868.

In any system where there is a need for an alignment of signals having different phases, there is usually limited isolation between the different input signals and the resultant signal thus bears a complex relationship to the input signals depending on the degree of interference therebetween. Typically, the errors will occur due to the fact that when more than one vector is present, the vectors that were measured separately will shift in phase due to the coupling of the other vectors. In this situation, a vector is defined as an input signal having a particular phase.

Thus, there is needed in the art for a system and method for aligning signals having different phases into a resultant signal combination having a certain characteristic all without directly measuring phase relationships.

There is a further need in the art for such a system and method which accepts a plurality of input vectors and adjusts the phase of each of the vectors, without making phase measurements, so that the resultant signal has a particular characteristic.

There is a still further need in the art for such a system where the outputs of the vectors are combined into a composite signal.

There is a still further need in the art for such a system in which the composite signal has the maximum signal strength and the phases of the individual vectors are adjusted to achieve such a maximum without measuring phase angles of the input vectors.

SUMMARY OF THE INVENTION

These and other objects, features and technical advantages are achieved by a system and method which allows for the calibration of an output composite signal from a plurality of input vectors having different phases by phase aligning the input vectors without measuring phase angles. The system and method of the present invention measures the resultant amplitude of the composite signal as each vector is rotated in phase. When the minimum signal level is achieved by the rotation of a specific vector, that vector is reversed (rotated) 180 degrees, which then results in the composite signal having its maximum value for that vector.

This process is repeated, in turn, for each of the other input vectors until all of the vectors have been rotated, first to find the minimum signal and then reversed to maximize that vector's contribution to the composite.

This process can be repeated as many times as necessary to achieve the desired degree of alignment error.

The importance of adjusting the phase becomes apparent from one example. Assume that it is desired to send a number of signals to a common point and the signals must pass through different cable lengths or paths before arriving at the destination. These signals then will arrive at the common destination point out of phase with one another in differing amounts. In such a situation it would be desirable to adjust the phase of each of the inputs so that the common output is as close to being in-phase with each other as is possible regardless of the interference and interaction between the cables (paths) and without knowing ahead of time what the various phase affecting characteristics are.

Therefore it is one technical advantage of my invention that the composite signal is achieved by aligning the input vectors without measuring phase angles.

Another technical advantage of my invention is to achieve the desired result without storing calibration data from each individual vector.

Another technical advantage of my invention is to achieve the desired result by only measuring output relative magnitudes in a recursive manner.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

Figure 1:
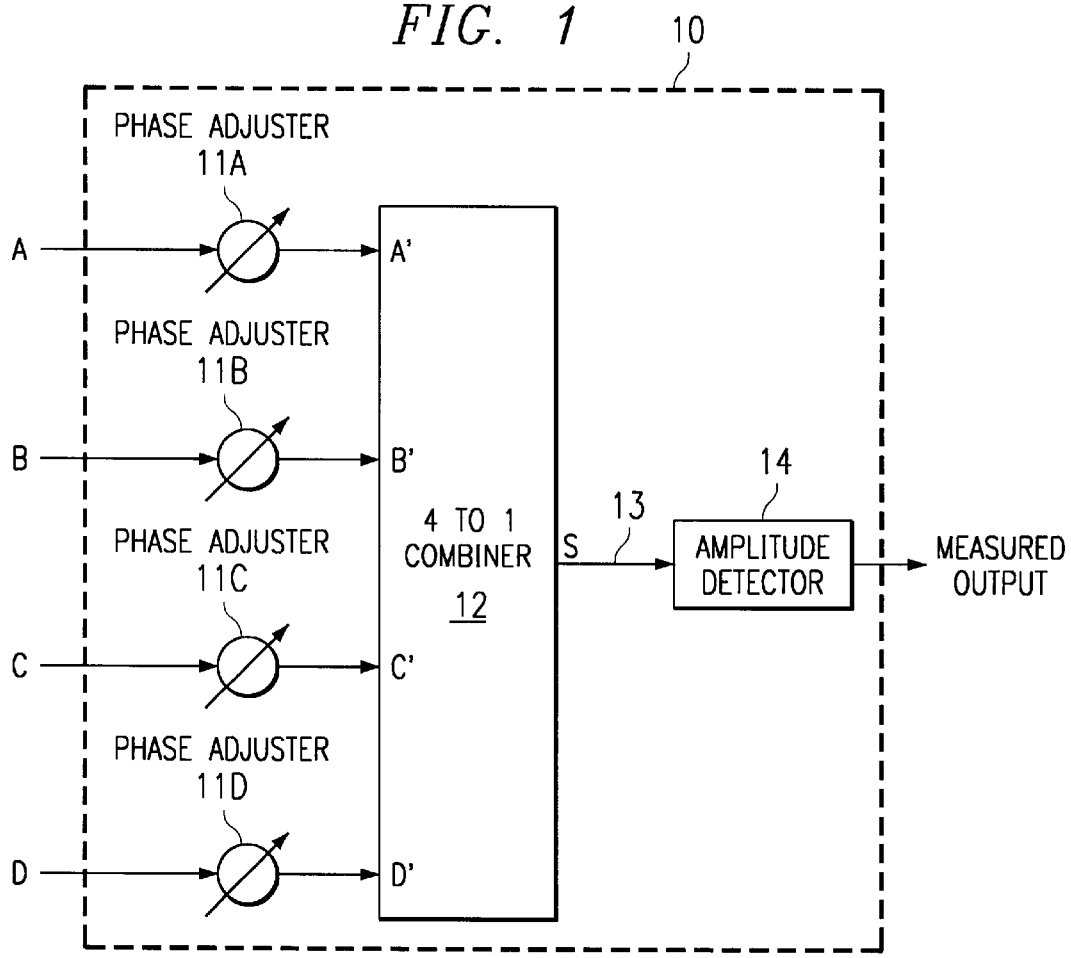
FIG. 1 shows an embodiment of the invention having four input signals and a common output signal.

Referring now to FIG. 1, there is shown an illustrative embodiment where, for example, four inputs A–D are shown as vectors going into circuit 10. The inputs, as shown, have equal magnitude and frequency but different phases. This invention is not limited to such an embodiment but rather the inputs need not be equal and the number of inputs need not be four.

Each input, A–D, goes to an individual phase adjuster 11A–11D which advantageously can be a transmission line delay or if desired can be accomplished by a DSP or by saw wave or by a quadrature phase shifter, or by any other type of phase shifter. Many different forms of phase adjustment can be used.

The outputs A'–D' of the phase adjusters act as inputs to combiner 12 which forms composite signal(s) 13. Combiner 12 can be any type of RF signal combiner, such as a Wilkinson combiner and can have any number of inputs. Composite signal 13 is measured by amplitude detector 14 to determine when the composite signal is at a minimum value. Detector 14, can, for example, be a RSSI detector (received signal strength indicator) or it can be a power average detector or a simple RF power meter or an RF detector diode with a volt meter. Commonly, such detectors are called null detectors, and can be of any type so long as a minimum value of the composite signal is determinable. Detector 14 can be analog or digital and can be hard wired or run on a computer (not shown), or could be a combination of the two. The important factor being that as the phase angle of an input vector is being changed the detector is capable of determining which phase angle results in the minimum value of the output. When this angle is determined, then the determined minimum phase angle is reversed by 180 degrees (assuming that it is desired to obtain the maximum composite signal).

Note that the phase alignment is good for a single frequency. In some systems, the calibration is made at one end of the frequency spectrum so as to not interfere with the RF transmission, thereby allowing the adjustment to be made "live." The calibration can be made at the center frequency if desired.

After the 180 degree reversal (as discussed above), a different input vector is selected for phase change and the composite signal is again measured to determine a minimum null value as the phase angle is changing. Again, when this minimum is achieved, the phase angle of the vector being operated on is rotated 180 degrees from the determined null angle.

Again, after such a reversal of the second vector a still different vector is selected for phase rotation and the process is repeated until all of the desired input vectors are adjusted. When this is accomplished the system can again repeat this procedure for all vectors as many times as is necessary to reduce the composite signal error as far as desired. In practice, two iterations are all that should be required.

Figure 3:
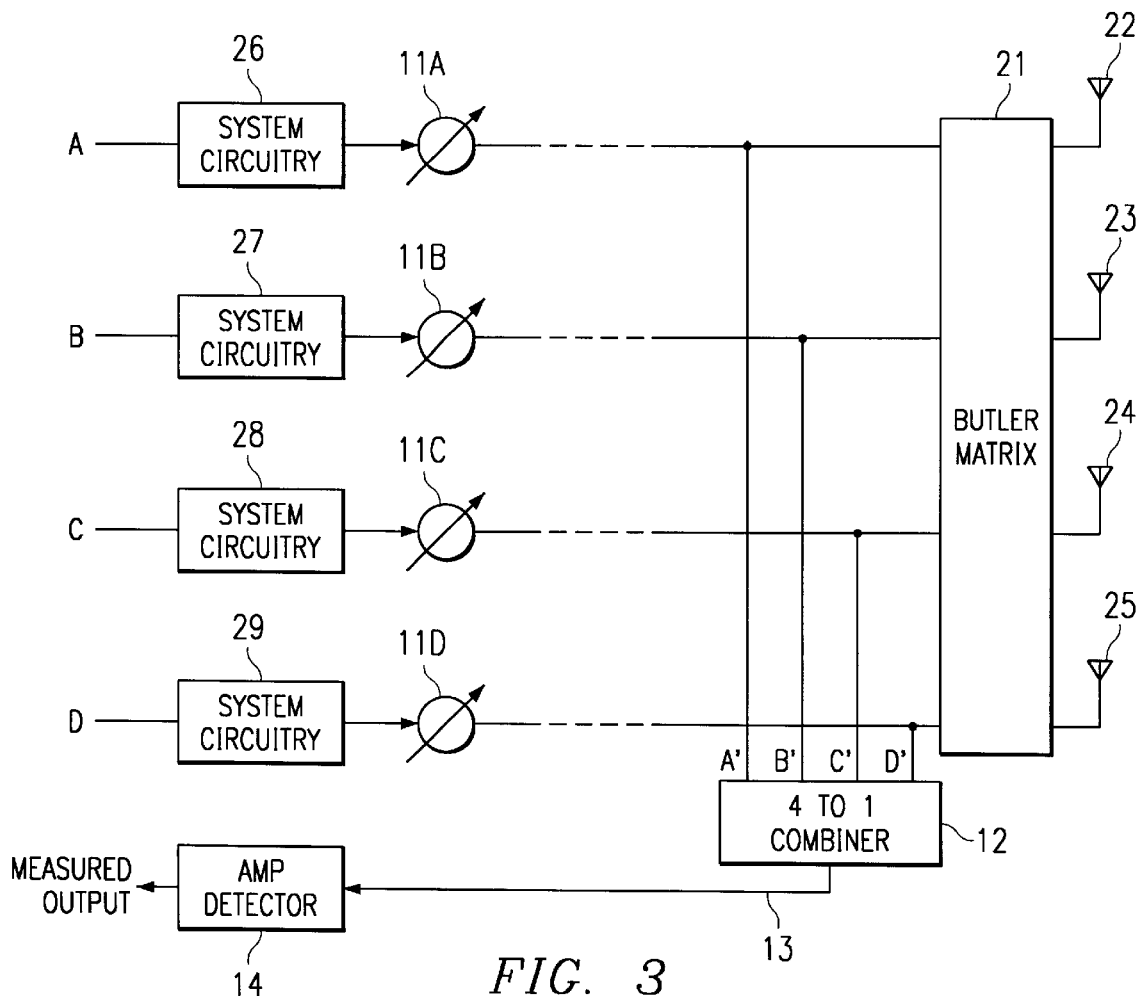
FIG. 3 shows an overall system diagram.

The phase can be changed with respect to any input at any place along the input path and in the illustrative embodiment is remote from the antenna itself Thus, as shown in FIG. 1, inputs A, B, C and D can actually be the same phase, but phase changes along one or more of the signal path lengths between inputs A–D and combiner 12 will serve to change the phase differently for each signal path before it arrives at combiner 12. It is this difference in phase at the far end (as shown in FIG. 3) that results in a composite signal being less than it otherwise could have been had the phase remained the same on all paths and the beams will not be formed properly by the butler matrix, as will be discussed hereinafter with respect to FIG. 3.

Figure 2A:
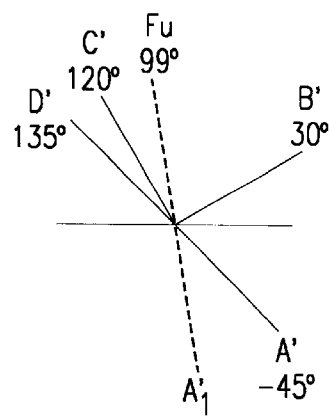
FIGS. 2A–2E show a vector analysis as each vector is changed in turn.
Figure 2B:
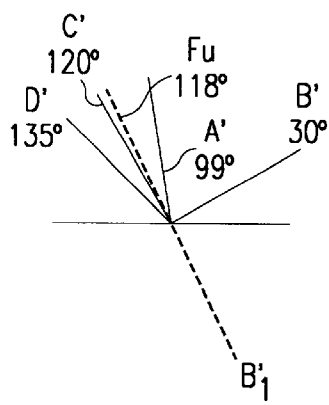

Reference is now made to FIGS. 2A–2E. We will discuss vectors A', B', C' and D' as they are combined in element 12 to form a composite vector S (13). It is the magnitude of S that is to be maximized. We can see the vectors A', B', C' and D' in FIG. 2A. If we consider vectors B', C' and D' by themselves, they would create the phantom vector FV. If we take vector A' and rotate it, there is a minimum in the upward magnitude of the composite vector FV which is the sum of all of the vectors when A' is 180 degrees out of phase with FV. This is shown as a dotted vector A'1. Vector A'1 is 180 degrees out of phase with phantom vector FV and if vector A'1 is rotated at 180 degrees, a new phase for vector A' will be created as shown in FIG. 2B.

Figure 2C:
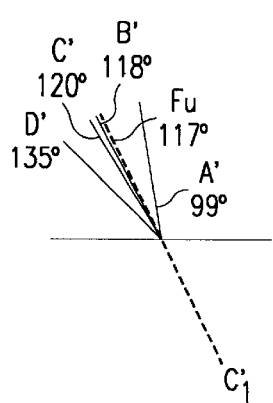

We continue the process with vector B'. Thus, if we consider phantom vector FV that is formed by vectors A', C' and D', we will get a vector of approximately FV. When vector B' is rotated, we will again find that there is a null of vector FV when B' is 180 degrees out of sync (vector B'1) with the new vector FV as shown in dotted line in FIG. 2B. At this point rotating vector B'1 180 degrees results in a new position for vector B' as shown in FIG. 2C.

Figure 2D:
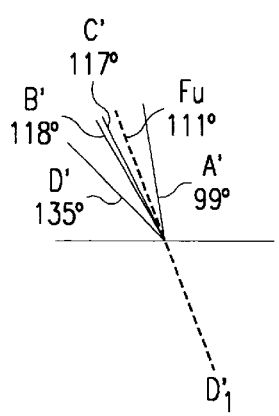

By this same process we take vector C' and find a composite vector that is formed by A', B' and D' and rotate C' until it is 180 degrees out of phase with phantom vector FV. This generates a vector C'1, shown in dotted form in FIG. 2C. We flip vector C'1 180 degrees to find a new position for vector C' as shown in FIG. 2D.

Figure 2E:
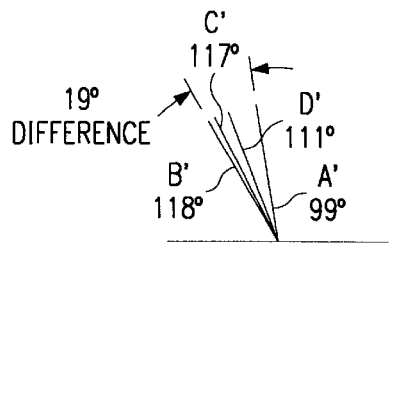

Now we look at the phantom vector that we obtain with A, B, C, and we rotate D until we find the minimum shown in FIG. 2E and labelled D'1. Again we flip vector D'1 180 degrees to obtain the new position of D'.

The result of this is that as we have gone through this process with each vector, the position of the vectors has started to converge from their original position. When we started the process there was 180 degrees difference between vectors and now we see that there is less than 20 degrees difference in the relative positions of the vectors. This can be seen between FIGS. 2A and 2E. The vectors have converged to give a composite vector S. This process is repeated until theoretically the vectors are lined up exactly on top of each other.

There are different ways of determining how and when we have these vectors as close as we want to get them. If we know the amplitude of the vector we can mathematically determine what function the amplitude of the composite will go through as we rotate any one vector. In other words, as we rotate a vector, there will be a peak and a null and a peak again. We can mathematically determine what this delta should be and we will achieve that delta when all the vectors are lined up as we will have an absolute maximum and we can get a predictable minimum when we have one vector that is opposing the other three.

Another way of determining maximum is when we go through the process. If the system remembers the positions of the vectors before it started the process and as it runs through the process, if the vectors do not change more than a given amount, the system knows that it has achieved a maximum value of signals. Thus, if we run through this whole process not knowing what position the vectors were in, but if we find that none of the vectors have changed more than 3 degrees, then we know that we were very close to being within 3 degrees of alignment before we started changing the phase. Typically, a system would try for plus or minus 7 degrees on any one vector or 14 degrees difference between the outside vectors. This range is flexible at the discretion of the system implimenter.

FIG. 3 shows how this phase alignment technique is used in a typical attenna system. In this example we have four signals, signals A, B, C and D that are going through the system and up to antenna panel 22, 23, 24 and 25. Each of these signals goes through some system electronics, amplifiers, attenuators, LPA assemblies and embedded in there is a phase shift of an unknown amount. The system uses a transmission line phase shifter where there are segments of transmission lines of different lengths. This is used to control the phase shift of the signals. The signals are routed through various lengths of line which results in different phase shifts depending how far the signal travels. If we need more phase shift, we route through more lengths of line, and if we want less phase shift, we just bypass a length of line.

In the antenna panel on each beam input there is a coupler which is where we obtain the signals, A', B', C' and D' (discussed above with respect to FIGS. 2A–2E). These coupled signals are then combined in 4 to 1 combiner 12, and these coupled signal(s) is the composite vector that forms phantom vector FV discussed previously as one of the vectors is rotated. The purpose of all this is to be sure that the phase of the signals going into the butler matrix are all the same phase (called 0—0 phase). From the output of the combiner the signal goes to the antenna and this is the signal that also goes back to the cell site (base) and then to the amplitude detection circuitry.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for aligning input signals of a composite signal where the input signals each comprise a vector having a particular phase, the method comprising the steps of
    determining a phase rotation of a first one of said vectors such that the composite signal is determined to be at its minimum value for such phase rotation;
    rotating the phase from the determined phase rotation of said first one of said vectors a specific amount; and
    repeating said determining and rotation steps for at least some of the other vectors.

2. The method of claim 1 wherein said specific amount of said rotation is 180 degrees.

3. The method of claim 1 wherein said determining and rotating steps are repeated for all of said vectors.

4. The method of claim 3 wherein said determining and rotating steps are again repeated vector by vector until a degree of error in the composite signal within a predetermined range is achieved.

5. The method of claim 1 where the composite signal is generated at a location physically remote from the input signals.

6. The method of claim 1 where the signals pass from the input signal vectors to the composite signal over different signal paths, each having different signal characteristics, and wherein the phase adjustment is made prior to the signals being applied to said signal paths.

7. The method set forth in claim 6 where the input signals are at a base station and the composite signal is generated at an antenna array.

8. A system for aligning input signals of a composite signal where the input signals comprise vectors, the system comprising:
    a null detector for determining a phase rotation of each phase vector of said signal vectors, one at a time, such that the composite signal is determined to be at its minimum value for each such vector phase rotation; and
    a phase reversal circuit for reversing the determined phase rotation of each of said phase vectors.

9. A system as set forth in claim 8 where the composite signal is generated physically remote from the input signals.

10. A system as set forth in claim 9 where the signals pass from the input signal vectors to the composite signal over different signal paths, each having different signal characteristics.

11. A system for aligning input signals of a composite signal where the input signals each comprise a vector having an adjustable phase, the system comprising
    means for determining a phase rotation of each of said vectors, one at a time, such that the composite signal is determined to be at its minimum value for each such vector phase rotation; and
    means for reversing the determined phase rotation of each of said vectors.

12. A system for providing signals to a combiner for communication of a composite signal to an antenna wherein said provided signals must have a relatively small phase differential thereinbetween and wherein said provided signals are communicated to said antenna array from a remote location over communication paths which introduce varying amounts of phase change to the respective signals, said system comprising:
    a phase adjuster for adjusting the phase of one of said provided signals such that the composite signal has a minimum value; and
    a phase rotation for changing the adjusted phase, said one provided signal by 180 degrees.

13. The system of claim 12 further including:
    a phase adjuster for adjusting the phase, in turn, of each of the other said provided signals such that the composite signal for each such adjustment has a minimum value; and
    a phase rotator for changing the adjusted phase of each of said provided signals by 180 degrees.

14. A phased array antenna system having a plurality of individual antennas arranged to simultaneously broadcast a signal such that a phase relationship of the signal as it appears at each such individual antenna determines a coverage area of the resultant signal, wherein said phased array is adapted to provide self-contained tuning of the phase of said signal as it appears at each individual antenna to maintain said phase relationship, said system comprising:
    means for communicating to each such individual antenna the signal, thereby providing a communicated signal to each such individual antenna having a desired phase;
    means for monitoring a magnitude of the signal actually received at each such antenna;

means controlled by said monitoring means for adjusting the phase of a first one of said communicated signals until the magnitude is monitored as being minimum as actually received at each said antenna;

means controlled by said adjusting means for rotating said adjusted phase by 180 degrees;

means controlled by said monitoring means for adjusting the phase of other ones of said communicated signals, one at a time, until the magnitude is monitored as being minimum for each such adjustment; and means controlled by said last-mentioned adjusting means for rotating, in turn, each of said adjusted phases by 180 degrees.

15. A method for providing signals to a combiner for communication of a composite signal to an antenna wherein said provided signals must have a relatively small phase differential therebetween and wherein said provided signals are communicated to said antenna array from a remote location over communication paths which introduce varying amounts of phase change to the respective signals, said method comprising the steps of:

adjusting the phase of one of said provided signal s such that said composite signal has a minimum value; and changing the adjusted phase of said one provided signal by 180 degrees.

16. The method of claim 15 further including the steps of:

adjusting the phase, in turn, of each of the other said provided signals such that said composite signal for each such adjustment has a minimum value; and changing the adjusted phase of each of said provided signals by 180 degrees.

* * * * *